July 1, 1930.  B. P. WHEELER  1,769,362
OPEN HEARTH FURNACE
Filed June 17, 1921  3 Sheets-Sheet 3
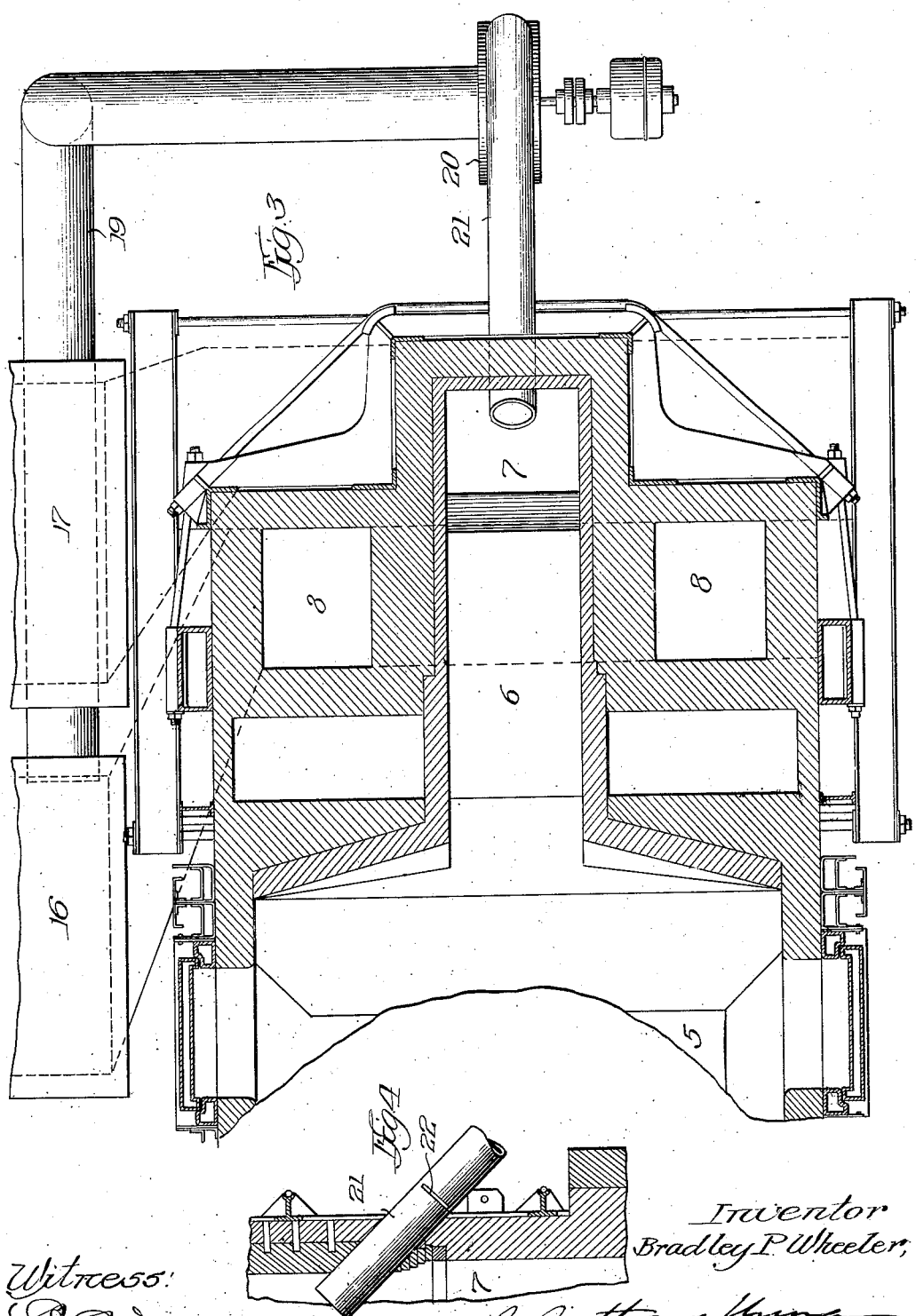

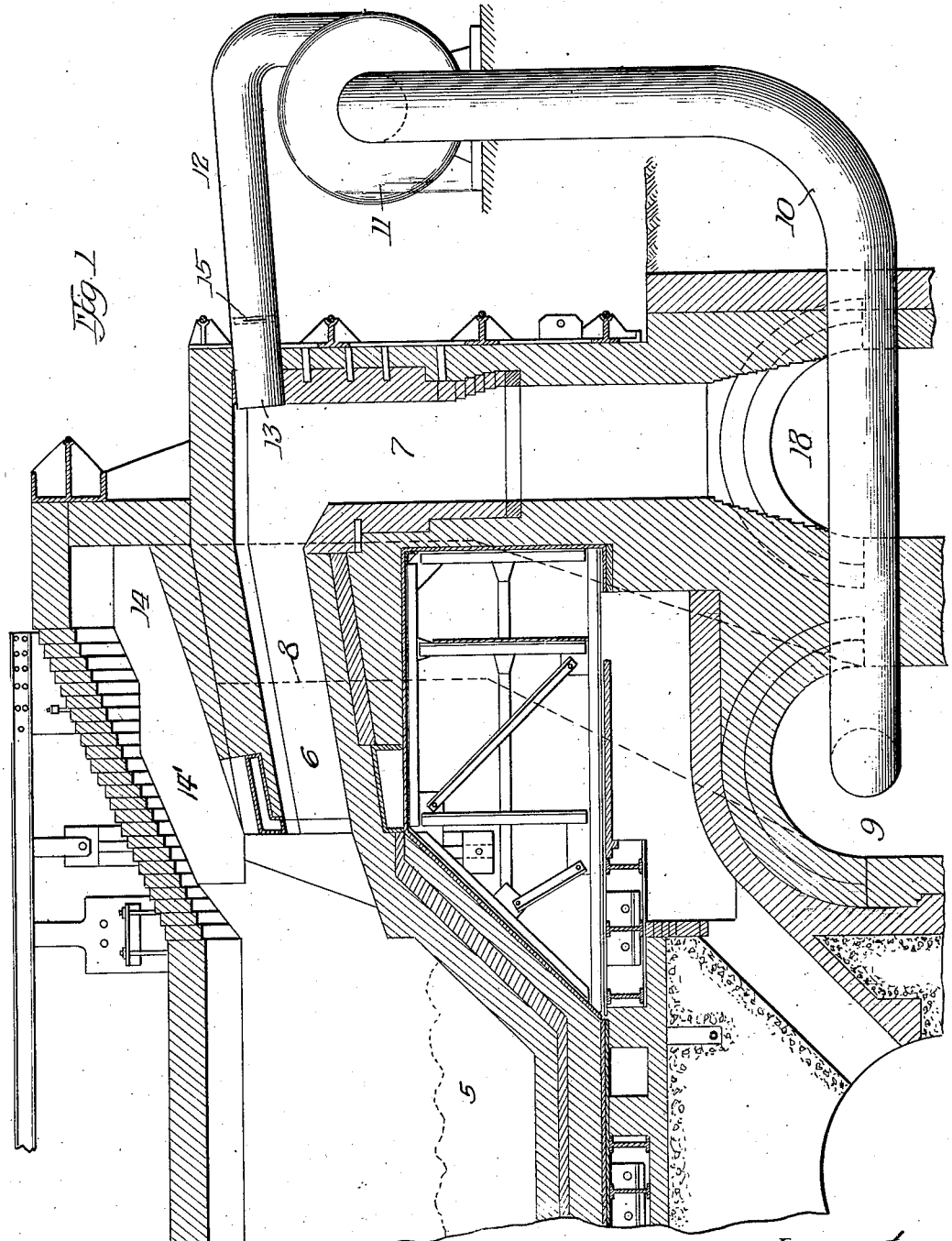

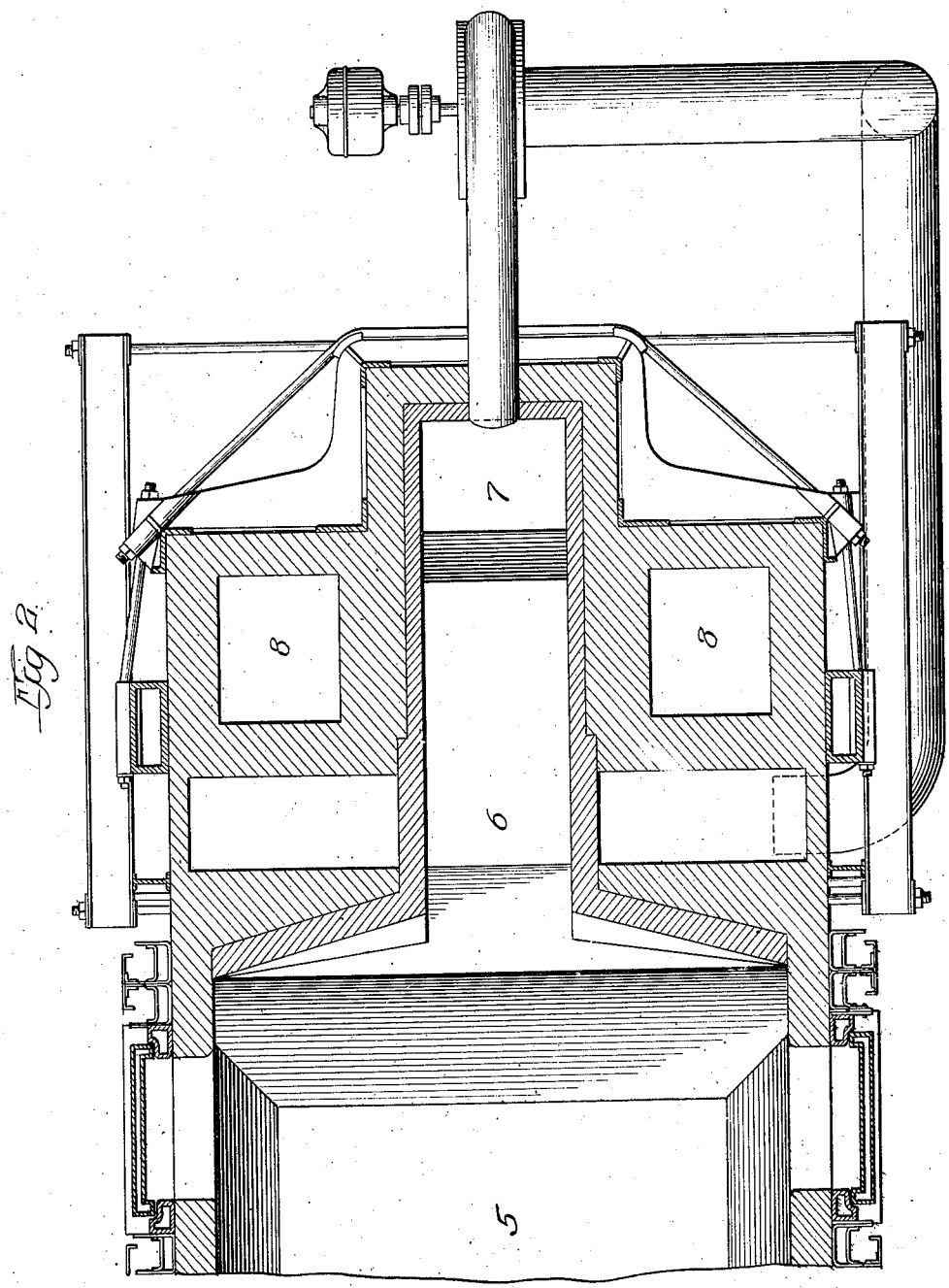

Patented July 1, 1930

1,769,362

UNITED STATES PATENT OFFICE

BRADLEY P. WHEELER, OF DULUTH, MINNESOTA

OPEN-HEARTH FURNACE

Application filed June 17, 1921. Serial No. 478,267.

This invention relates to a new and improved open hearth furnace construction, and also to a method for operating such furnaces. More particularly it is directed to a means and method adapted to produce a quick-burning hot flame adjacent the incoming ports of the furnace whereby the full surface of the metal bath is acted on.

As is well known in open hearth practice, such furnaces are double-ended and provided at each end with regenerative chambers, slag pockets, and air and gas uptakes and ports. The furnace is periodically reversed in its operation so that each end is alternately the incoming and outgoing end of the furnace. The incoming air and gas are heated to a high temperature by passing through checker chambers before entering the furnace, and the heat of the furnace flame is thus increased.

In furnaces of this character as now generally constructed, the air and gas enter through separate ports at each end of the melting chamber, the air and gas intermingling as they enter the furnace and combustion there taking place. However, this intermingling takes place relatively slowly so that the full effect of combustion is not afforded until some distance from the incoming port. This results in inadequate heating of the portion of the bath adjacent the incoming port and thus does not allow the furnace to operate to its maximum efficiency. A further difficulty lies in the fact that since the combustion takes place well into the melting chamber, a portion of the flame tends to sweep through the outgoing end of the furnace. This results not only in great loss of heat but also wears away the outgoing ports and passages and materially decreases the life of the furnace.

It is an object of the present invention to so introduce the air and gas as to cause quick combustion adjacent the incoming ports whereby the full surface of the metal bath is operated upon at all times.

It is a further object to provide means introducing heated air into the midst of the gas flow and thus to increase the rapidity of the intermixture of air and gas.

Other and further objects will appear as the description proceeds.

Broadly, my invention comprises the addition to open hearth furnaces of usual type of an auxiliary air passage leading from the main heated air passages to the gas passage. A blower may be provided to draw the air through this auxiliary passage and force it under pressure to the gas passage. In its preferable form air is drawn from the air slag pocket and introduced into the gas uptake at the point where the uptake turns into the gas port, and in substantial alignment with that port. However, the essential feature is that heated air is drawn through an auxiliary passage and delivered to the gas passages, and this air may be taken if desired from the air checker or any portion of the heated air passages and it may be delivered to the gas passages at varying points as desired.

I have illustrated certain preferred embodiments of my invention in the accompanying drawings, in which—

Figure 1 is a vertical section showing one end of an open hearth furnace with my invention applied thereto;

Figure 2 is a horizontal section showing the device of Figure 1;

Figure 3 is a view similar to Figure 2, but showing a modified form of the device; and Figure 4 is a fragmentary view illustrating the entrance of the auxiliary air passage of Figure 3 into the gas uptake.

Referring now to Figures 1 and 2, the open hearth furnace shown comprises the melting chamber 5, gas port 6, gas uptakes 7, and air uptakes 8. As best shown in Figure 1, the air uptakes 8 lead from the air slag pocket 9. I provide the auxiliary air passage 10, the lower end of which enters the air slag pocket 9. This passage 10 leads to the blower 11 and the discharge pipe 12 from the blower is lead at 13 into the upper end of the gas uptakes 7 in substantial alignment with the gas port 6. The air uptakes 8 are joined at 14 above the gas port 6 and the usual air port 14' encircles the gas port.

The damper 15 is provided in the passage 12 adjacent its end 13.

In the form shown in Figures 3 and 4, the furnace itself is similar in construction to that just described. In Figure 3 the air checker chamber 16 is shown connected to the air slag pocket 9 and the similar gas checker 17 is shown connected to the gas slag pocket 18. In this form of the device the auxiliary air passage 19 leads from the air chamber 16 to the blower 20 and from the blower 20 the discharge pipe 21 is led into the gas uptake at the angle shown in Figure 4. This pipe 21 is also provided with a damper 22.

In the operation of either form of the device, when the end of the furnace is used as an incoming end, the blower is put in operation and it draws a certain amount of the preheated air from either the checker chamber or slag pocket, as the case may be, and delivers that air under forced draft to the gas passages. This air is at a temperature in the neighborhood of 2000 degrees Fahrenheit, and the blowers and passages will be suitably water-cooled and lined in a manner necessary to take care of this temperature. The dampers 15 and 22 are provided mainly for the purpose of preventing the highly heated outgoing gases from entering the auxiliary passages upon the outgoing end of the furnace. They may, however, also be used to regulate the force and amount of the incoming air.

The air is introduced in the midst of the gas stream, thoroughly mixes with the gas, and combustion quickly takes place, and the flame begins immediately adjacent the gas port. The amount of air put through the auxiliary passages is, of course, not sufficient for complete combustion of all the gas, but the air and gas stream issuing from the gas port is inclosed upon its sides and the top by the air coming up the usual uptakes 8. When the auxiliary stream of air is under pressure it tends to draw with it the gas from the uptake and this increases the velocity of the gas. For certain purposes, in order to secure a more complete mixture and greater aspirating effect on the gas, it may be desirable to use an auxiliary air passage entering at an angle as shown in Figures 3 and 4. It is to be understood, of course, that the production and location of the introduction of the auxiliary air into the gas stream is independent of whether the air is withdrawn from the air slag pocket, the air checkers, or other parts of the air passages. The air may be withdrawn or introduced at points most suitable for the particular installation involved and most desirable for accomplishing the exact results desired. The essential feature is that a considerable volume of heated air is introduced into the gas at a point before the gas enters the melting chamber, so that adequate mixture and quick combustion take place.

I claim:

1. A regenerative open hearth furnace having a combined air and gas port and air ports at each end thereof, air flues communicating with said air ports, gas flues communicating with said combined air and gas ports, air ducts at each end of said furnace communicating with said air flues and combined air and gas ports so as to allow air from said air flues to pass into said combined air and gas ports, and means for inducing a flow of air from said air flues to said combined air and gas ports.

2. A regenerative open hearth furnace having a combined air and gas port and air ports at each end thereof, air flues communicating with said air ports, gas flues communicating with said combined air and gas ports, air ducts at each end of said furnace communicating with said air flues and combined air and gas ports so as to allow air from said air flues to pass into said combined air and gas ports, means for inducing a flow of air from said air flues to said combined air and gas ports, and means for varying the flow of air to said combined air and gas ports.

3. A regenerative open hearth furnace having a combined air and gas port and air ports at each end thereof, air flues communicating with said air ports, gas flues communicating with said combined air and gas ports, air ducts at each end of said furnace communicating with said air flues and combined air and gas ports so as to allow air from said air flues to pass into said combined air and gas ports, and blowers in said air ducts to the rear of said gas ports, said blowers being adapted to have a flow of fluid under pressure therethrough so as to eject the mixture of air and gas from said combined air and gas ports, and also to provide a suction to draw the gas and air into said ports.

4. A regenerative open hearth furnace having a combined air and gas port at each end thereof and air ports at each side of said combined air and gas ports, gas uptake flues for said combined air and gas ports, air uptake flues for said air ports, and auxiliary airways leading from said air uptake flues to said gas uptake flues to provide a combined air and gas supply to said combined air and gas ports, and means for inducing a flow of air through said auxiliary airways into said gas uptake flues.

Signed at Duluth, Minnesota, this 9th day of June, 1921.

BRADLEY P. WHEELER.